(12) United States Patent
Thompson et al.

(10) Patent No.: US 6,968,372 B1
(45) Date of Patent: Nov. 22, 2005

(54) DISTRIBUTED VARIABLE SYNCHRONIZER

(75) Inventors: Donald Thompson, Mercer Island, WA (US); Ernest R. Ewert, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 774 days.

(21) Appl. No.: 09/981,026

(22) Filed: Oct. 17, 2001

(51) Int. Cl.[7] ............................................. G06F 15/173
(52) U.S. Cl. ....................... 709/223; 719/318; 719/310
(58) Field of Search ................. 709/201–203, 709/217–218, 223–224, 248; 719/310, 313, 719/318

(56) References Cited

U.S. PATENT DOCUMENTS

| | | |
|---|---|---|
| 5,588,147 A | 12/1996 | Neeman et al. |
| 5,787,247 A | 7/1998 | Norin et al. |
| 5,787,262 A | 7/1998 | Shakib et al. |
| 5,812,773 A | 9/1998 | Norin |
| 5,812,793 A | 9/1998 | Shakib et al. |
| 5,850,520 A * | 12/1998 | Griebenow et al. ......... 709/206 |
| 5,873,097 A * | 2/1999 | Harris et al. ................ 707/203 |
| 5,956,489 A | 9/1999 | San Andres et al. |
| 6,021,443 A * | 2/2000 | Bracho et al. .............. 709/241 |
| 6,202,085 B1 | 3/2001 | Benson et al. |
| 6,449,667 B1 * | 9/2002 | Ganmukhi et al. ........... 710/28 |
| 6,457,065 B1 * | 9/2002 | Rich et al. .................. 719/328 |
| 6,772,418 B1 * | 8/2004 | Morris ........................ 719/318 |

OTHER PUBLICATIONS

Herlihy et al., "Scalable Concurrent Counting," ACM Transactions on Computer Systems, vol. 13, Issue 4, 1995, USA, 343-364.

* cited by examiner

*Primary Examiner*—St. John Courtenay, III
*Assistant Examiner*—George L. Opie
(74) *Attorney, Agent, or Firm*—Senniger Powers

(57) ABSTRACT

A system and method of synchronizing at least one variable such as a counter among a network of distributed computers where the computers communicate via asynchronous message passing. The distributed computers are organized as nodes in a tree. Each computer in the tree is capable of functioning as a parent, child, or both. For each variable to be synchronized, each parent receives a contribution from a child which includes contributions from any children of the child and returns other contributing values to the child. The child then updates the local value of the variable with the returned contributing values. The returned contributing values include contributions to the variable from all computers in the tree other than the child and other than any children subordinate to the child in the tree. Each computer can have multiple children.

26 Claims, 9 Drawing Sheets

DISTRIBUTED VARIABLE SYNCHRONIZER

TECHNICAL FIELD

The present invention relates to the field of distributed computing. In particular, this invention relates to a system and method for synchronizing variables among a plurality of members of a parent-child computer hierarchy.

BACKGROUND OF THE INVENTION

Computers within a network often share data with other computers in the network. In some distributed computing systems, the computers share synchronized variables such as counters where each computer stores a local copy of the current value of the variable. The variable is synchronized among the computers in that the current value of the variable reflects contributions to the variable from all computers in the network. Systems involving thousands of variables, for example, across an enterprise network quickly lose synchronization.

Some prior art systems share data by replication. In these systems, data from a master computer is transmitted to one or more slave computers for storage. While the slave computers in these prior art systems maintain a copy of the data from the master computer, they are unable to modify the data or communicate the modifications to the master computer.

In other prior art systems, each computer in the network updates a local copy of the variable. Various counting techniques can be performed on the computers to obtain a total value of a variable. However, in large-scale networks with rapidly-changing variable values, these counting techniques can be time-consuming and inaccurate.

For these reasons, an improved system and method of synchronizing variables in a distributed computing system is desired to address one or more of these and other disadvantages.

SUMMARY OF THE INVENTION

The invention synchronizes at least one variable such as a counter among a network of distributed computers in a parent-child computer hierarchy where the computers communicate via asynchronous message passing. Each member computer in the hierarchy executes the method of the invention and is capable of functioning as a parent, child, or both. Each member computer in the hierarchy registers as a child computer with a parent computer. For each variable to be synchronized, each parent in the hierarchy receives a contribution from a registered child and returns other contributing values to the registered child. The registered child then updates the local value of the variable with the returned contributing values. The returned contributing values include contributions to the variable from all members in the hierarchy other than the registered child and other than any children subordinate to the registered child in the hierarchy. Each member computer can have multiple children registered to the member computer.

The invention manages distributed, additive counter values by maintaining the synchronization of thousands of integral variable values across a network including potentially hundreds of computers within reasonable tolerance levels. The invention provides every computer in the network with a reasonably accurate global view of the variables. The invention allows the creation of scalable and distributed systems that meet the business needs of contract-driven Internet advertising while minimizing application and network impact.

In accordance with one aspect of the invention, a computerized method synchronizes at least one variable among a plurality of members of a parent-child hierarchy based on data values exchanged between said plurality of members. Each member has a calculated value of the variable. The method includes a child sending a first data value to a parent of the child. The first data value represents a contribution to the variable from the child and any members subordinate to the child in the hierarchy. The method also includes the parent updating a second data value with the received first data value. The second data value represents a contribution to the variable from all members other than the parent. The method also includes the parent transmitting a third data value to the child. The third data value represents a contribution to the variable from all members other than the child and other than any members subordinate to the child in the hierarchy. The method also includes the child updating a fourth data value with the transmitted third data value. The fourth data value represents a contribution to the variable from all members other than the child.

In accordance with another aspect of the invention, a computer-readable medium has computer-executable components for synchronizing at least one variable based on values exchanged between a plurality of members of a parent-child hierarchy. The components for each specific member include an interface component and an operator component. The interface component receives a parent value from a parent of the specific member. The operator component calculates an updated parent value in response to the parent value received by the interface component. The updated parent value includes contributions to the variable from the specific member and any members subordinate to the specific member in the hierarchy. The interface component transmits the updated parent value to the parent of the specific member.

A computer-readable medium embodying aspects of the invention stores a data structure for synchronizing at least one variable based on values exchanged between a plurality of members of a parent-child hierarchy. The data structure for each specific member includes a first field, a second field, and a third field. The first field stores a calculated global value representing contributions to the variable from all members other than the specific member. The second field stores a local value representing contributions to the variable from the specific member. The third field stores a parent value representing contributions to the variable as received from a parent of the specific member.

In yet another embodiment of the invention, a system synchronizes at least one variable among members of a child parent hierarchy based on data values exchanged between said members. Each member has a calculated value of the variable. The system includes means for a child to send a first data value to a parent of the child. The first data value represents a contribution to the variable from the child and any members subordinate to the child in the hierarchy. The system also includes means for the parent to update a second data value with the received first data value. The second data value represents a contribution to the variable from all members other than the parent. The system also includes means for the parent to transmit a third data value to the child. The third data value represents a contribution to the variable from all members other than the child and other than any members subordinate to the child in the hierarchy. The system also includes means for the child to update a fourth data value with the transmitted third data value. The fourth data value represents a contribution to the variable from all members other than the child.

In accordance with yet another aspect of the invention, a computer-readable medium has computer-executable components for delivering one or more advertisements and tracking run-time capacity for each advertisement. The computer-readable medium is associated with at least one server wherein each server is a node in a tree structure. The components include a transaction component for delivering the advertisements and a maintenance component for counting each advertisement delivered by the transaction component and synchronizing the count for each delivered advertisement among each node in the tree structure.

Alternatively, the invention may comprise various other methods and apparatuses.

Other features will be in part apparent and in part pointed out hereinafter.

DETAILED DESCRIPTION OF THE INVENTION

The invention relates to a method and system for synchronizing data such as variables among a network of computers. Each computer in the network has a calculated value of the synchronized data. In one embodiment, the computers are distributed and connected via one or more networks such as described in connection with FIG. 1 (see below). The computers communicate via asynchronous message passing as connection speeds between the various computers may vary. The variables, for example, may be counters that can be adjusted by positive or negative values.

In one embodiment of the invention, the invention is operable with an Internet advertising system including clusters of computers distributed worldwide. Each computer in the advertising system delivers a varying number of different advertisements. The advertising system is driven by advertiser contracts that specify delivery goals that must be met for each advertisement. If the delivery goals are not met, the advertising system suffers a revenue impact. The invention is operable with such an advertising system to accurately determine the total number of advertisements of a given type that have been delivered by all the distributed computers in the advertising system. Further, the invention may be used to track runtime capacity. In this instance, the variables are counters representing the number of ad impressions, the number of ad views, and the like.

Operating Environment

Figure 1:
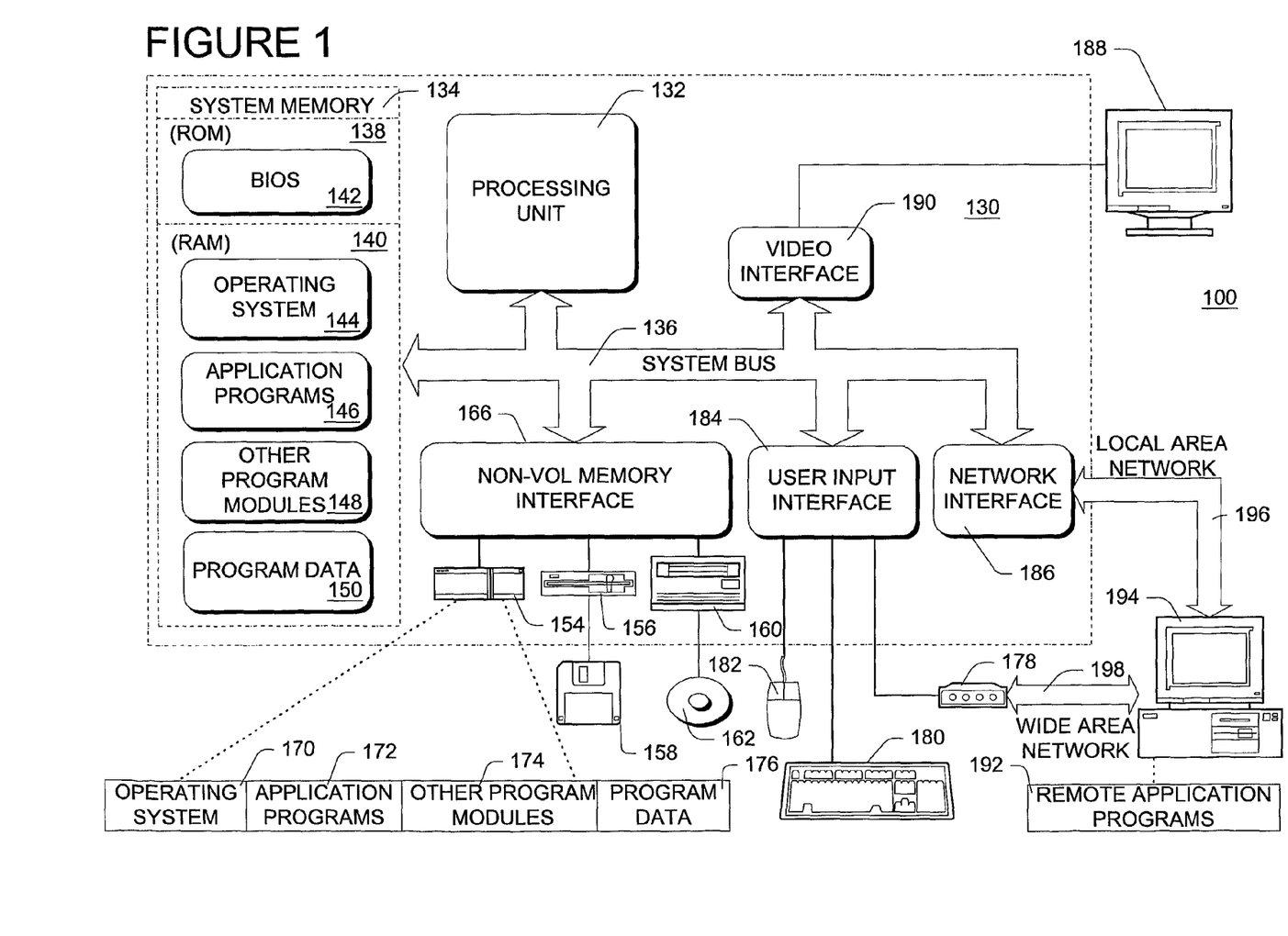
FIG. 1 is a block diagram of one embodiment of the method and system of the invention illustrating an example of a suitable computing system environment on which the invention may be implemented.

Referring first to FIG. 1, a block diagram illustrates one example of a suitable computing system environment 100 on which the invention may be implemented. The computing system environment 100 is only one example of a suitable computing or operating environment and is not intended to suggest any limitation as to the scope of use or functionality of the invention. Neither should the computing system environment 100 be interpreted as having any dependency or requirement relating to any one or combination of components illustrated in the exemplary computing system environment 100.

FIG. 1 shows one example of a general purpose computing device in the form of a computer 130. In one embodiment of the invention, a computer such as the computer 130 is suitable for use in the other figures illustrated and described herein.

Computer 130 preferably has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 preferably includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 1 illustrates operating system 144, application programs 146, other program modules 148, and program data 150.

The computer 130 may also include other removable/non-removable, volatile/nonvolatile computer storage media. For example, FIG. 1 illustrates a hard disk drive 154 that reads from or writes to non-removable, nonvolatile magnetic media FIG. 1 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 1, provide storage of computer readable instructions, data structures, program modules and other data for the computer 130. In FIG. 1, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a universal serial bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 1 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 1 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Registration and Subscription

Figure 2:
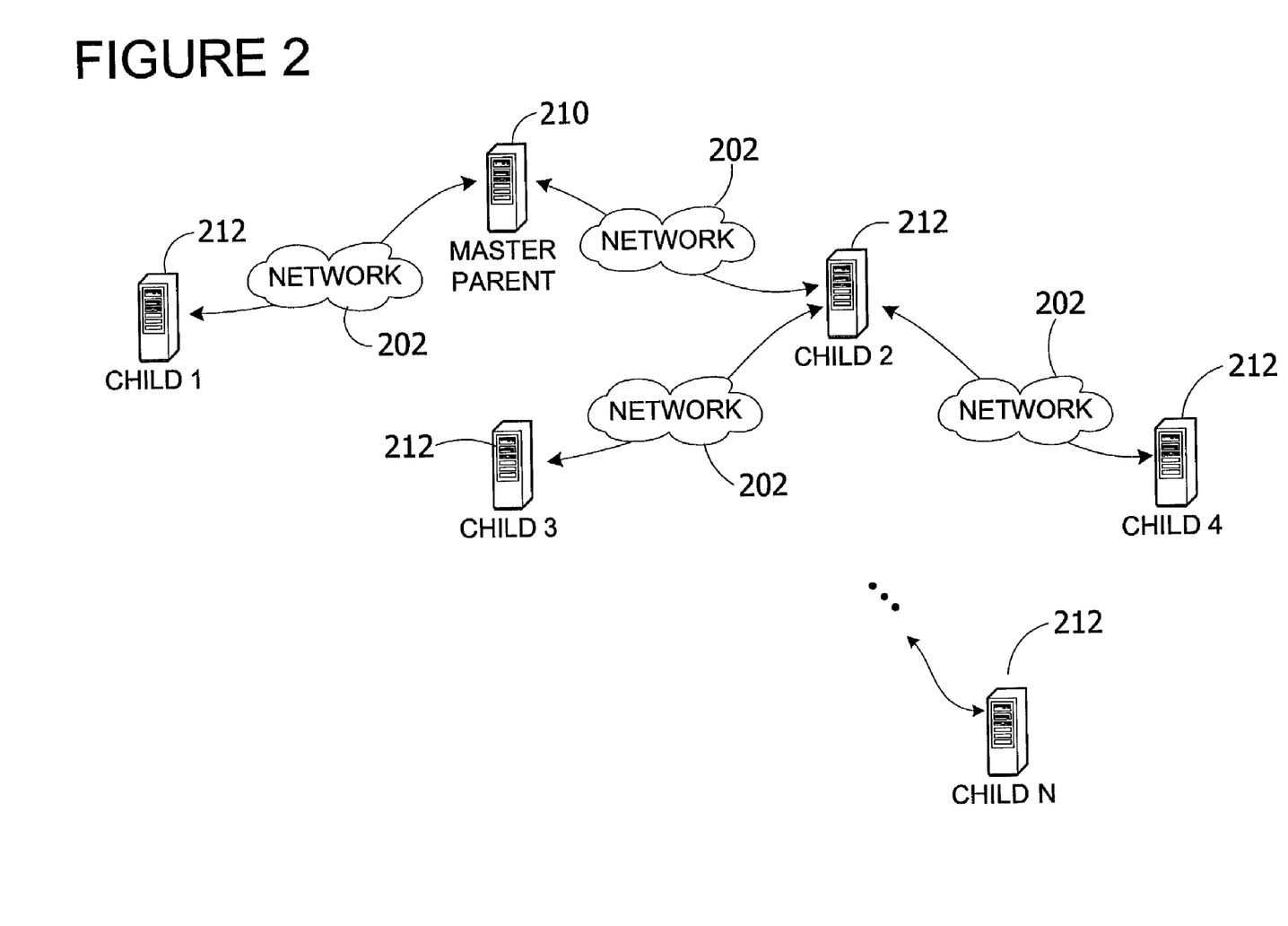
FIG. 2 is a block diagram of one embodiment of the invention illustrating a parent-child hierarchy for synchronizing variables.

Referring next to FIG. 2, a block diagram illustrates a parent-child hierarchy for synchronizing variables. The parent-child computer hierarchy includes member computers connected directly with one another or via networks 202. The networks 202 may be individual networks, part of the same network (i.e., the Internet), or a combination of networks such as those described with reference to FIG. 1 (see above). A Master Parent 210 computer resides at a root or summit of the hierarchy. Each parent can have one or more child instances 212. While the Master Parent 210 in some embodiments may have hundreds of children 212 or more (indicated by Child N), directly and indirectly connected to the Master Parent 210, the exemplary embodiment in FIG. 2 includes four children 212: Child 1, Child 2, Child 3, and Child 4. In FIG. 2, the Master Parent 210 has two registered child 212 computers: Child 1 and Child 2. Child 2, as a parent, has two child 212 computers: Child 3 and Child 4. In this example, the Master Parent 210 is a parent to Child 1 and Child 2. Child 2 is a parent to Child 3 and Child 4. Child 1, Child 3, and Child 4 do not have any children. In one embodiment, the member computers communicate via two-way asynchronous message passing on the Internet. In this embodiment, each child 212 determines a synchronization data rate for communicating with the child's parent (i.e., master parent 210 or another child 212).

The networked computers are organized as nodes or members in a tree structure or other parent-child hierarchy. Each member computer in the hierarchy is capable of functioning as a parent, child, or both. The method of the invention is executable on each member in the hierarchy. Each member computer in the hierarchy registers as a child computer with a parent computer. A variable calculated by a specific member includes contributions from any local application programs, any children, and a parent. Each member computer can have multiple children registered to the member computer. However, in one embodiment, each member computer can be registered to only one parent per synchronized variable. That is, a specific Member X can be registered to Parent Y for variable Count 1 and Parent Z for variable Count 2, but the specific member cannot be registered to both Parent Y and Parent Z for variable Count 1. In another embodiment, each member computer can be registered to only one parent for all the variables maintained by that member computer.

Each parent in the parent-child computer hierarchy receives a contribution from each child registered to the parent and returns other contributing values to each registered. Each registered child then updates the value of the variable as calculated by the registered child with the returned contributing values. For each registered child, the returned contributing values include contributions to the variable from all members in the hierarchy other than the registered child and any children of the registered child.

In operation, for each variable to be synchronized, each specific member in the parent-child computer hierarchy receives a parent value from a parent and a child value from each child. The received parent value represents contributions to the variable from all members other than the specific member and any children subordinate to the specific member. Each received child value represents contributions to the variable from the child and any children subordinate to the child in the hierarchy. The specific member updates local values with the received values. The specific member also calculates updated parent and child values for transmission to the parent and child, respectively. Children subordinate to the specific member in the hierarchy include any children directly registered or indirectly registered to the specific member in the hierarchy.

Figure 3:
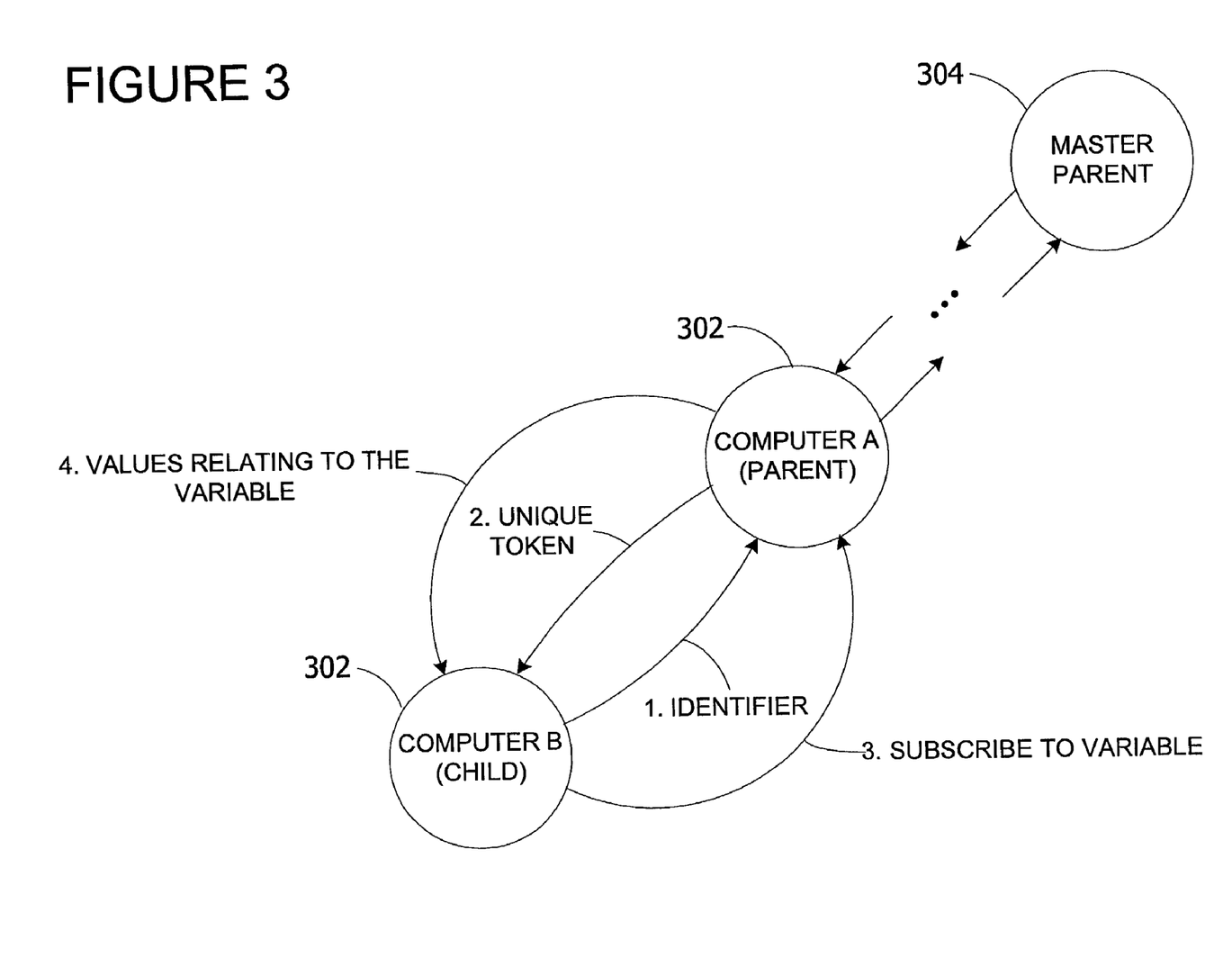
FIG. 3 is a block diagram of one embodiment of the invention illustrating a child registering with a parent and subscribing to a variable.

Referring next to FIG. 3, a block diagram illustrates a child registering with a parent and subscribing to a variable for synchronization. To synchronize at least one variable, a computer joins a parent-child computer hierarchy by registering with a member of the hierarchy. While a Master Parent 304 at a root or summit of the hierarchy in some embodiments may have hundreds of children or more, directly and indirectly connected to the Master Parent 210, the exemplary embodiment in FIG. 3 illustrates two children 302: Computer A and Computer B. In FIG. 3, Computer A is a member of the hierarchy that has indirectly registered with the Master Parent 304 via other members in the hierarchy (not shown). In other embodiments (not shown), Computer A may be a master parent. Computer B wishes to synchronize at least one variable and registers with Computer A. After registration, Computer A is referred to as a child of Computer B, and Computer B is referred to as a parent of Computer A.

After registration, the registered member (Computer A) subscribes to at least one variable stored by the parent for synchronization. The parent (Computer B) transmits to the child (Computer A) at least one value relating to the subscribed variable to update a value of the variable stored by the child. After subscription, both the parent and the child store values representing the current value of the variable. If an error occurs during registration or subscription, the parent transmits an error packet to the child.

Registration and subscription can occur via various methods. In the exemplary embodiment of FIG. 3, registration is decentralized and involves several steps referred to as "tokenizing." That is, an inefficient string name or other member identifier associated with each member computer is replaced with an efficient token. With reference to FIG. 3, Computer B transmits to Computer A a member identifier specific to Computer B. Computer A assigns and delivers a token to Computer B corresponding to the member identifier. At this point, Computer A will refer to Computer B using the assigned, delivered token in communications between Computer A and Computer B. The token is efficient for communication and unique among the children of Computer A. In one exemplary embodiment, the tokenizing is two-way in that Computer B also "tokenizes" a member identifier associated with Computer A. As such, Computer B then refers to Computer A using the token for Computer A in all communications between Computer A and Computer B.

In one embodiment, the token assigned to each member computer is a formulated name. That is, the tokenizing process results in the same generated token for a specific member identifier regardless of which member is generating the token. In one embodiment, the generated token is an index into a lookup table to enable fast access to variable values. For example, the lookup table may be a standard hash table that returns the appropriate values in response to a given index.

For example, during registration, a variable string member identifier such as "Computer A" may be replaced with a more efficient and unique token with a value such as 0xffee0054 (hexadecimal). The variable string "Computer A" requires 72 bits (10 characters*8 bits/character=72 bits). The token value 0xffee0054 requires 32 bits (8 hexadecimal digits*4 bits/hexadecimal digit=32 bits) which is significantly smaller and hence more efficient for communication. In this example, each token is a 32-bit value.

Computer B subscribes to at least one variable stored by Computer A by requesting at least one value relating to the variable from Computer A. Computer A delivers the value relating to the variable to Computer B. Subscription operates through successive members of the hierarchy to the Master Parent 304 at the root or summit of the hierarchy. The Master Parent 304 maintains a list of the registered members and the variables to which they have subscribed. In this manner, for example, the Master Parent 304 facilitates error recovery should any member of the hierarchy fail.

To subscribe to a specific variable, a child computer such as Computer B requests updates from a parent computer such as Computer A regarding a specific variable by referencing a string name or other variable identifier corresponding to the variable to be synchronized. Each member computer knows a priori the variable identifier associated with each variable available from the parent. Similar to the tokenizing process for member identifiers, the variable identifier for each variable is then tokenized during subscription between a child computer and a parent computer. That is, the inefficient variable identifier for a variable is replaced with a formulated name or token associated with the variable identifier. In one embodiment, any of the member computers produce the same formulated name for a specific variable identifier.

In one embodiment, an application program or other software operating according to the invention creates, communicates, coordinates, and destroys the variable identifiers and corresponding tokens as needed. The tokens are specific to each parent/child relationship and may be different in each direction between the parent and child. Each member computer in the invention employs lookup tables, for example, to manage the association between the tokens and values for the variables. In this embodiment, the formulated name for a specific variable represents an index into a lookup table that stores the values related to the specific variable. The formulated name may also be used as an index into a lookup table that relates the formulated name to the variable identifier for the variable.

Further, each parent and child can synchronize multiple variables during a single synchronization event. In this embodiment, each data packet exchanged between the parent and child includes the token and a related value for each variable to be synchronized. The related value differs for each step of the method of the invention as described in FIG. 5 (see below). For example, for each variable to be synchronized, each data packet exchanged between the parent and child includes a 32-bit token and a 64-bit data value. As such, each variable requires 12 bytes of space in the data packet during each exchange between the parent and child during variable synchronization. Those skilled in the art will note that the sizes of the tokens and the data values for each variable in this example are merely exemplary and that the sizes can vary based on the specific implementation of the method and system described herein. For example, the token may be 8-bits and the data values may be 128-bits.

During subscription, a variable identifier string name such as "Counter 1" may be replaced with a more efficient and unique token (e.g., with a value of 0xffee0054 hexadecimal). In contrast, the variable string "Counter 1" requires 72 bits (9 characters*8 bits/character=72 bits). The token value 0xffee0054 requires 32 bits (8 hexadecimal digits*4 bits/hexadecimal digit=32 bits) which is significantly smaller and hence more efficient for communication.

In another embodiment, the invention can prioritize synchronization in different ways. For example, processing priority may be given to specific children of the parent. In addition, priority may be given to specific variables to ensure that their values are synchronized more often. In one embodiment, assigning one of five different priority levels to each variable identifies the priority for each variable. In another embodiment, a plurality of variables are partitioned during each synchronization event for inclusion in the data packet. For example, only some of the variables that have been updated since the previous synchronization event are included in the data packet during a given synchronization event. The remaining variables are updated during subsequent synchronization events.

Data Structure

Figure 4:
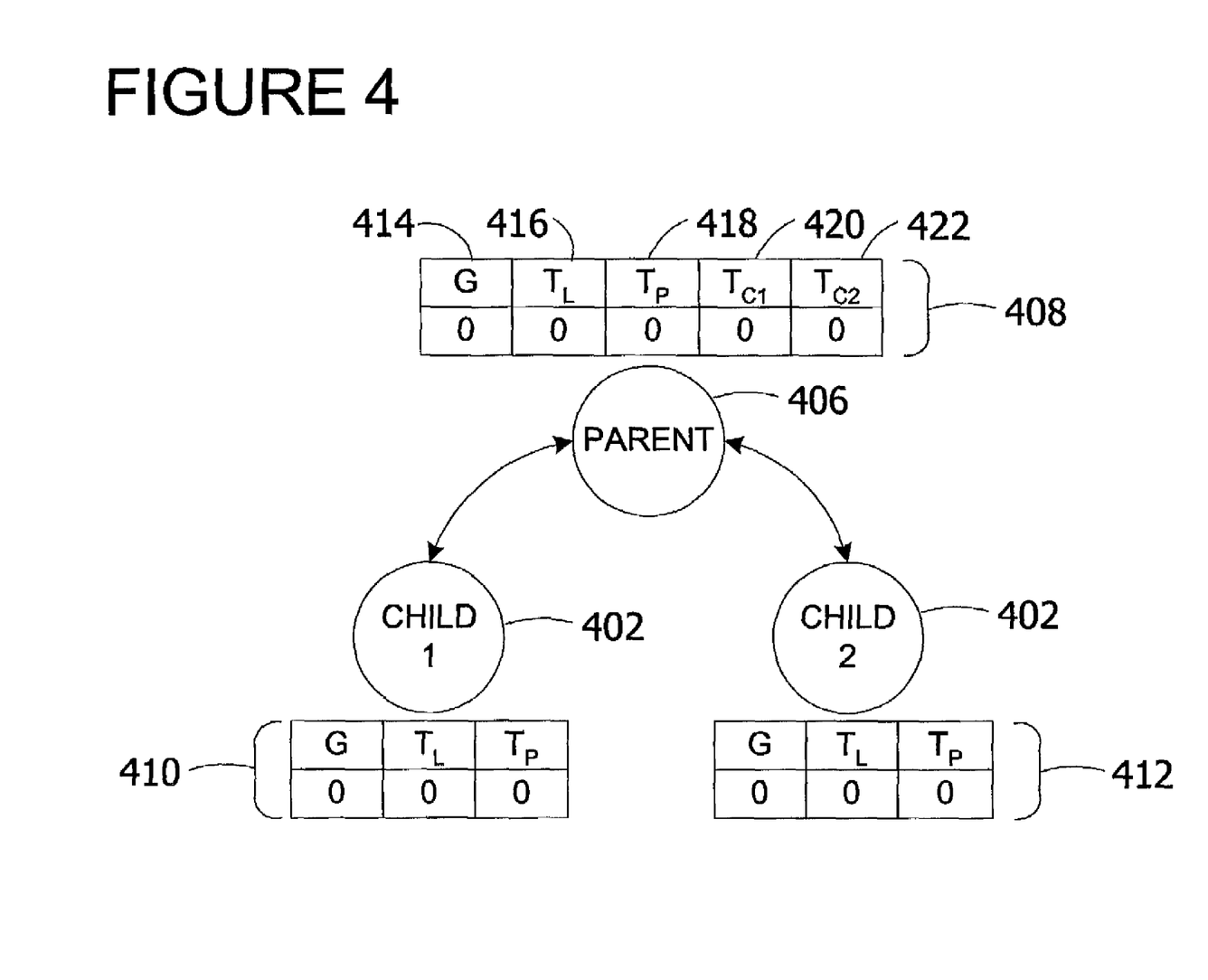
FIG. 4 is a block diagram of one embodiment of the invention illustrating a parent and two children initializing variable values.

Referring next to FIG. 4, a block diagram illustrates a parent and two children initializing variable values. While a Parent 406 in some embodiments may have hundreds of children or more, directly and indirectly connected to the Parent 406, the exemplary embodiment in FIG. 4 includes two children 402: Child 1 and Child 2. In FIG. 4, Child 1 and Child 2 are registered children of the Parent 406 in the hierarchy. Child 1 and Child 2 have subscribed to the same variable. FIG. 4 shows the values representing the variable that are stored by each specific member for each variable. Each member stores the values in data structures 408, 410, 412 on computer-readable media as described in FIG. 1 (see above). Exemplary data structures 408, 410, 412 include several fields. For example, in the Parent 406, a first field 414 stores a calculated global value (G) representing contributions to the variable from all members other than the specific member. A second field 416 stores a local value ($T_L$) representing contributions to the variable from the specific member. A third field 418 stores a parent value ($T_P$) representing contributions to the variable as received from a parent of the specific member. For a specific member that has one or more children 402, the data structure further includes one or more child value fields 420, 422 corresponding to the one or more children of the specific member. Each child value field 420, 422 stores a child value ($T_{Ci}$) representing contributions to the variable as received from each of the one or more children of the specific member. For example, since the Parent 406 in FIG. 4 has two children 402, two child value fields 420, 422 have been created: $T_{C1}$ and $T_{C2}$. During initialization, the data structures 408, 410, 412 for Child 1, Child 2, and Parent 406 are created and initialized to zero by the respective member computer. A processor, memory, and computer-executable instructions for creating the data structure and setting the global value, local value, parent value, and the child value(s) to zero constitute means for initializing the variable for a child. In one embodiment, the global, local, parent, and child values are 64-bit, unsigned integers.

In one embodiment, the data structure for a parent also stores a "dirty flag" or other indicator for each child of the parent for each variable that has been updated by the parent independent of the child. In such a case, the value of the variable stored by the child is outdated. A boolean variable constitutes exemplary means for the parent to maintain such an indicator, where TRUE indicates that the child's value of the variable has been synchronized with the parent's value, and FALSE indicates that the child has not yet been synchronized. Further, the examples described above and examples described elsewhere herein constitute exemplary means for the parent to maintain such an indicator.

Synchronization Formulae

Figure 5:
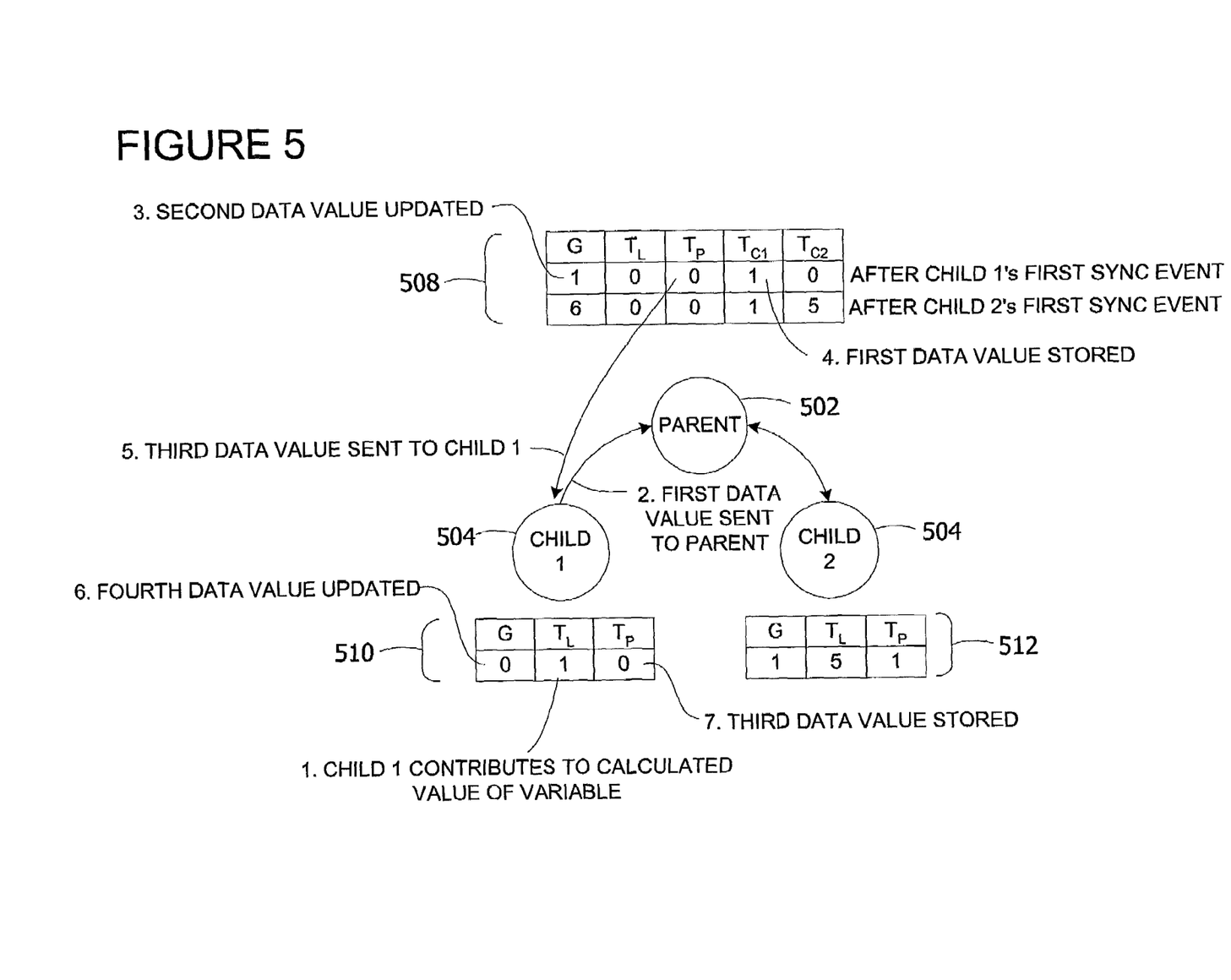
FIG. 5 is a block diagram of one embodiment of the invention illustrating a child updating a variable and synchronizing the variable with a parent.

Referring next to FIG. 5, a block diagram illustrates a child updating a variable and synchronizing the variable with a parent during a synchronization event. In one embodiment, the variable is a counter. While a Parent 502 in some embodiments may have hundreds of children 504 or more, directly and indirectly connected to the Parent 502, the exemplary embodiment in FIG. 5 includes two children 504: Child 1 and Child 2. Child 1, Child 2, and Parent 502 are members in a parent-child computer hierarchy and exchange data values during the synchronization event to synchronize at least one variable. While the exchange of data values during the synchronization event may occur synchronously or asynchronously, the exchange of data values embodied in FIG. 5 occurs asynchronously. In one embodiment, the synchronization event is initiated by a child. Each member of the parent-child computer hierarchy has a calculated value of the variable. Children 504 (i.e., Child 1, Child 2), and Parent 502 each have data structures 508, 510, 512 as described in FIG. 4. The data structure 508 for Parent 502 reflect the values of each field in the data structure after the first synchronization events by Child 1 and Child 2. The data structures 510, 512 for Child 1 and Child 2 reflect the values of each field after their respective first synchronization events. A synchronization example (shown below) illustrates the updating of each field in the data structures 508, 510, 512 with values as shown in FIG. 5 during the synchronization events. In the embodiment of FIG. 5, Child 1 contributes to a first data value ($T_{C1}'$, from the perspective of Parent 502) by increasing the value of the variable as calculated by Child 1. Since Child 1 calculates a value of the variable by summing the global value (G) and the local value ($T_L$), Child 1 contributes to the first data value by updating G and/or $T_L$. For example, in an advertisement delivery embodiment of the invention, Child 1 updates $T_L$ by the number of advertisements that have been delivered since the last synchronization event. The update to G and/or $T_L$ triggers a synchronization event during which Parent 502 and Child 1 exchange values to synchronize the variable.

The first data value represents a contribution to the variable from Child 1 and any members subordinate to Child 1 in the hierarchy. Members that are "subordinate" to Child 1 include any directly or indirectly registered children of Child 1. In one embodiment, the first data value is calculated by Child 1 with the following equation (1).

$$\text{First data value } (T_{C1}') = G + T_L - T_P \quad (1)$$

Child 1 then sends the first data value to Parent 502. Parent 502 updates a second data value (G) with the received first data value. The second data value represents a contribution to the variable from all members in the hierarchy other than Parent 502. In one embodiment, the second data value is calculated by Parent 502 with the following equation (2).

$$\text{Second data value } (G) = G' + (T_{C1}' - T_{C1}) \quad (2)$$

where G' is the current global value stored by Parent 502 and $T_{C1}$ is a child value for Child 1 currently stored by Parent 502. Parent 502 also replaces the current child value ($T_{C1}$) with the received first data value ($T_{C1}'$).

Parent 502 calculates and transmits a third data value ($T_P'$) to Child 1. The third data value represents a contribution to the variable from all members other than Child 1 and other than any members subordinate to Child 1 in the hierarchy. In one embodiment, the third data value is calculated by Parent 502 with following equation (3).

$$\text{Third data value } (T_P') = G + T_L - T_{C1} \quad (3)$$

Child 1 updates a fourth data value (G) with the received third data value. The fourth data value (G) represents a contribution to the variable from all members other than Child 1. In one embodiment, the fourth data value is calculated by Child 1 with the following equation (4).

$$\text{Fourth data value } (G) = G' + (T_P' - T_P) \quad (4)$$

where G' is the current global value stored by Child 1 and $T_P$ is a parent value currently stored by Child 1. Child 1 also replaces the current parent value ($T_P$) with the received third data value ($T_P'$).

In an advertisement delivery embodiment, an advertisement delivery application program executing on Parent 502 or one of the children 504 (e.g., Child 1) may need to know how many advertisements have been delivered for a specific sponsor. The advertisement delivery application program can calculate a value of the variable representing the number of advertisements that have been delivered by summing G and $T_L$. That is, Parent 502 calculates a value of the variable by summing the second data value (G) and the contribution to the variable from Parent 502 ($T_L$). Similarly, Child 1 calculates a value of the variable by summing the fourth data value (G) and the contribution to the variable from Child 1 ($T_L$).

In one embodiment, the method illustrated in FIG. 5 is encoded as an object based on the Component Object Model (COM) specification. In another embodiment, the method is represented as a plug-in to another application program.

Those skilled in the art will note that the exchange of data between a parent and a child described herein can be electronically implemented with any transport or protocol. For example, the exchange of data values according to the invention may be implemented via hypertext transfer protocol (HTTP) or transmission control protocol/Internet protocol (TCP/IP).

A processor, network interface device, and a network connection constitute exemplary means for a child to send the first data value to the parent of the child. A processor, memory, and computer-executable instructions constitute exemplary means for the parent to update a second data value with the received first data value. A processor, network interface device, and a network connection constitute exemplary means for the parent to transmit a third data value to the child. A processor, memory, and computer-executable instructions constitute exemplary means for the child to update a fourth data value with the transmitted third data value. Further, the examples described above and examples described elsewhere herein constitute exemplary means for a child to send the first data value to the parent of the child, exemplary means for the parent to update a second data value with the received first data value, exemplary means for the parent to transmit a third data value to the child, and exemplary means for the child to update a fourth data value with the transmitted third data value.

Figure 6:
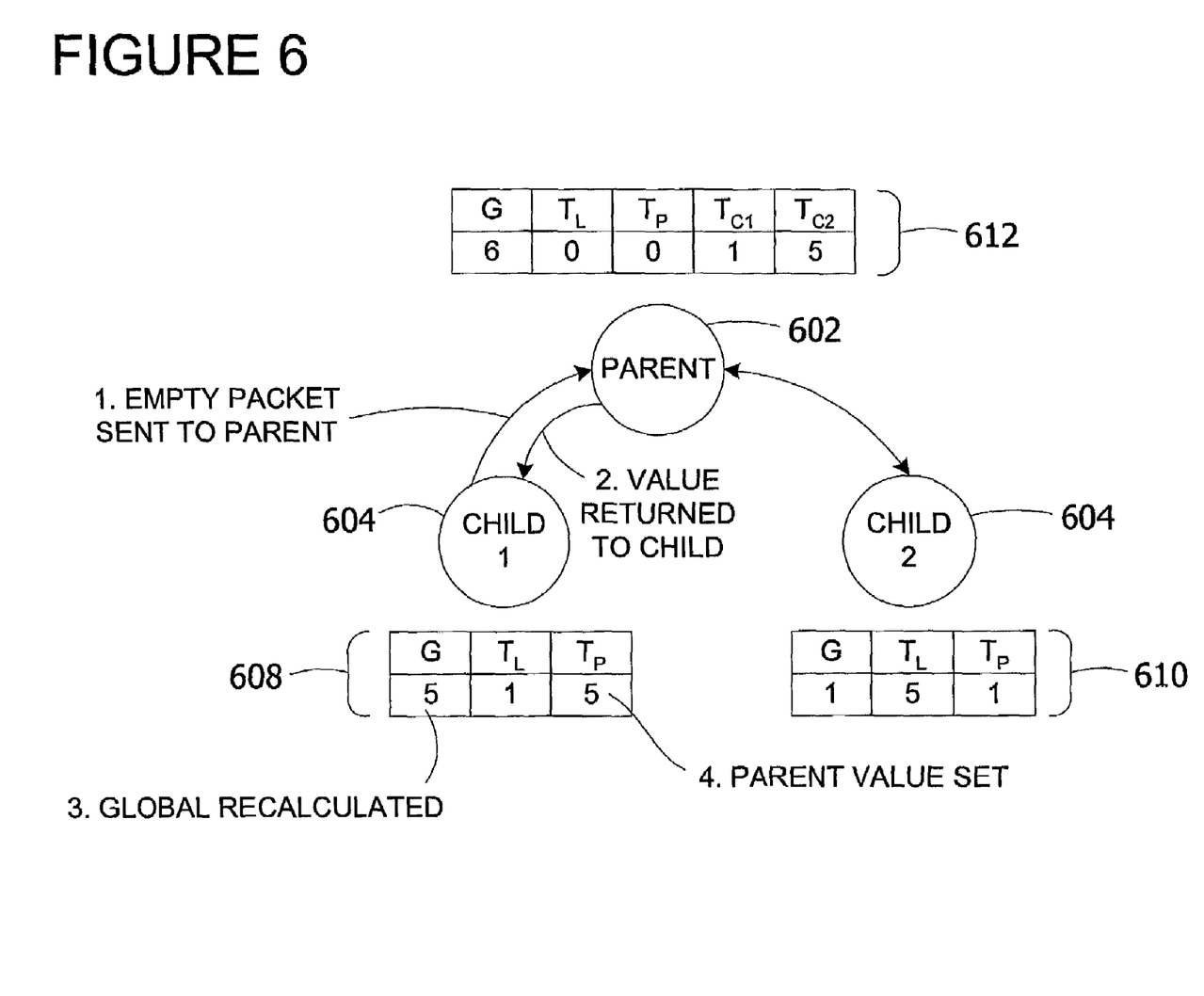
FIG. 6 is a block diagram of one embodiment of the invention illustrating a child synchronizing a variable with a parent.

Referring next to FIG. 6, a block diagram illustrates a parent updating a child with a variable during a synchronization event. While a Parent 602 in some embodiments may have hundreds of children 604 or more, directly and indirectly registered to Parent 602, the exemplary embodiment in FIG. 6 includes two children 604: Child 1 and Child 2. Children 604 (i.e., Child 1, Child 2), and Parent 602 are members in a parent-child computer hierarchy and exchange data values during the synchronization event to synchronize at least one variable. The data structures 608, 610, 612 for Child 1, Child 2, and Parent 602 reflect the values of each field after the second synchronization event by Child 1. A synchronization example (shown below) illustrates the updating of each field in the data structures 608, 610, 612 with values as shown in FIG. 6 during the synchronization event. In contrast with FIG. 5, FIG. 6 illustrates a situation in which Child 1 requests an update from Parent 602 without Child 1 first updating a local value of the variable during a synchronization interval. The synchronization interval reflects the time between synchronization events. The embodiment of FIG. 6 may occur, for example, when Child 1 determines that the calculated value of the variable is "stale" since the elapsed time since the last synchronization event has exceeded a given threshold. In this embodiment, Child 1 transmits an empty packet to Parent 602 to trigger the synchronization event. Parent 602 returns the updated value of the variable to Child 1 per the formulae described herein. Child 1 stores the parent value (replace $T_P$ with $T_P'$) and recalculates the global value (G).

Optimizing Memory Accesses for Multi-processor Member Computers

Figure 7:
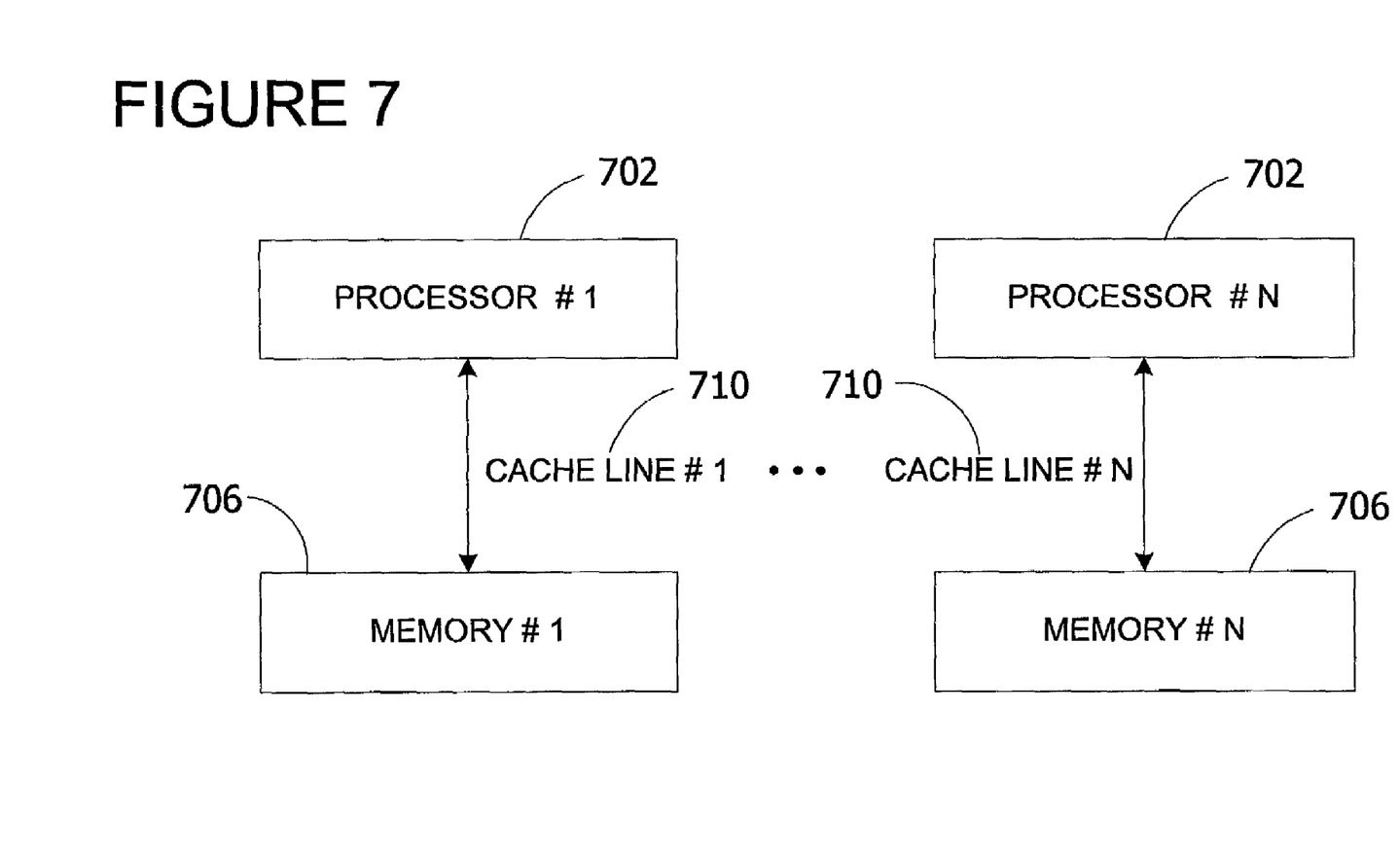
FIG. 7 is a block diagram of one embodiment of the invention illustrating a multi-processor environment with dedicated memory components and cache lines.

Referring next to FIG. 7, a block diagram illustrates a multi-processor environment with dedicated memory components and cache lines. In the exemplary multi-processor embodiment of FIG. 7, at least one member computer in the parent-child computer hierarchy includes a plurality of processors 702 such as processor #1 through processor #N with one thread executing on each processor 702. In a non-optimized environment, all the processors 702 would perform operations within the same memory space. As such, each processor 702 would lock a memory bus to prevent the other processors 702 from accessing the memory space while the locking processor 702 performs the memory operations for a specific variable. However, multiple processors 702 performing memory operations to update multiple variables results in significant memory bus contention and delay. In an optimized environment according to the invention and as illustrated in FIG. 7, each processor 702 has access to a separate a memory component 706 such as memory #1 through memory #N such that all memory operations by that processor 702 occur locally. An application program or other software executing on the computer in an optimized environment calculates a total value for a variable by summing the values relating to the variable from each memory component 706. The optimized environment scales linearly as processors 702 are added to the computer since there is no bus contention on a read operation and no contention between processors 702 when any of the processors 702 write to their respective memory components 706.

Similarly, to prevent overwriting cache data from the other CPUs, an optimized environment includes providing a separate cache line 710 such as cache line #1 through cache line #2 for each processor 702 to access the provided memory component 706. Each processor 702 performs operations or otherwise operates on data via the provided memory component 706 instead of via a register to maintain consistency. Software accesses all memory components 706 of a member (e.g., memory #1 through memory #N) to calculate a value of a variable.

In a further optimized embodiment of the invention, each operation performed by a processor 702 is quantum safe in that an operating system for use with the invention is restricted from rescheduling the execution of the instructions that compose a memory operation. A quantum safe operation ensures the integrity of the results of the operation.

Providing a memory component 706 and a cache line 710 for each processor 702, performing operations via the memory components 706 instead of via registers, and ensuring quantum safe execution of operations constitute exemplary means for optimizing access to memory by each processor 702. Further, the examples described above and examples described elsewhere herein constitute means for optimizing access to memory by each processor 702.

Exemplary Computer-Readable Media

Figure 8:
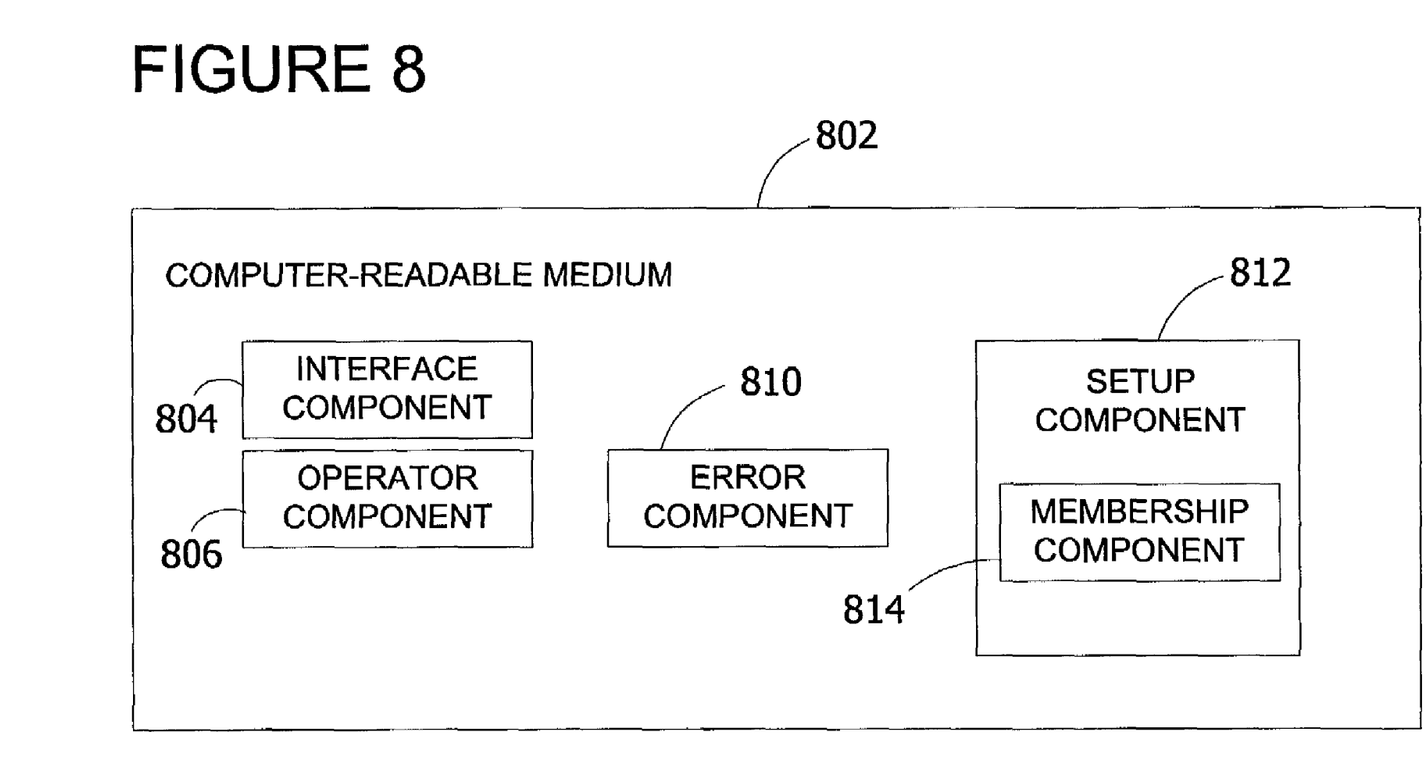
FIG. 8 is a block diagram of one embodiment of the invention illustrating an exemplary computer-readable medium on which the invention may be stored.

Referring next to FIG. 8, a block diagram illustrates an exemplary computer-readable medium on which the invention may be stored. The computer readable medium 802 has computer-executable instructions for performing the method of the invention. The computer-readable medium 802 includes components for synchronizing at least one variable based on values exchanged between a plurality of member of a parent-child computer hierarchy. Each specific member of the parent-child hierarchy has a computer-readable medium 802 as shown in FIG. 8. The computer-readable medium 802 includes an interface component 804, an operator component 806, an error component 810, and a setup component 812. The interface component 804 receives a parent value from a parent of the specific member and a child value from at least one child of the specific member. The received parent value represents contributions to the variable from all members other than the specific member and other than any children subordinate to the specific member. The received child value represents contributions to the variable from the child and any children subordinate to the child in the hierarchy. The interface component 804 also stores the received values. The operator component 806 calculates an updated parent value and an updated child value. The updated parent value includes contributions to the variable from the specific member and any members subordinate to the specific member in the hierarchy. The updated child value includes contributions to the variable from all members other than the child and other than any members subordinate to the child in the hierarchy. The interface component 804 transmits the updated parent value to the parent of the specific member and the updated child value to the child of the specific member. The error component 810 recovers from failure by a member of the hierarchy. The initialization component initializes a variable. The setup component 812 includes a membership component 814 for registering the specific member with the parent to synchronize a specific variable. Those skilled in the art will note that the components illustrated in FIG. 8 may be distributed among one or more computer-readable media accessible by the specific member in accordance with the invention.

Figure 9:
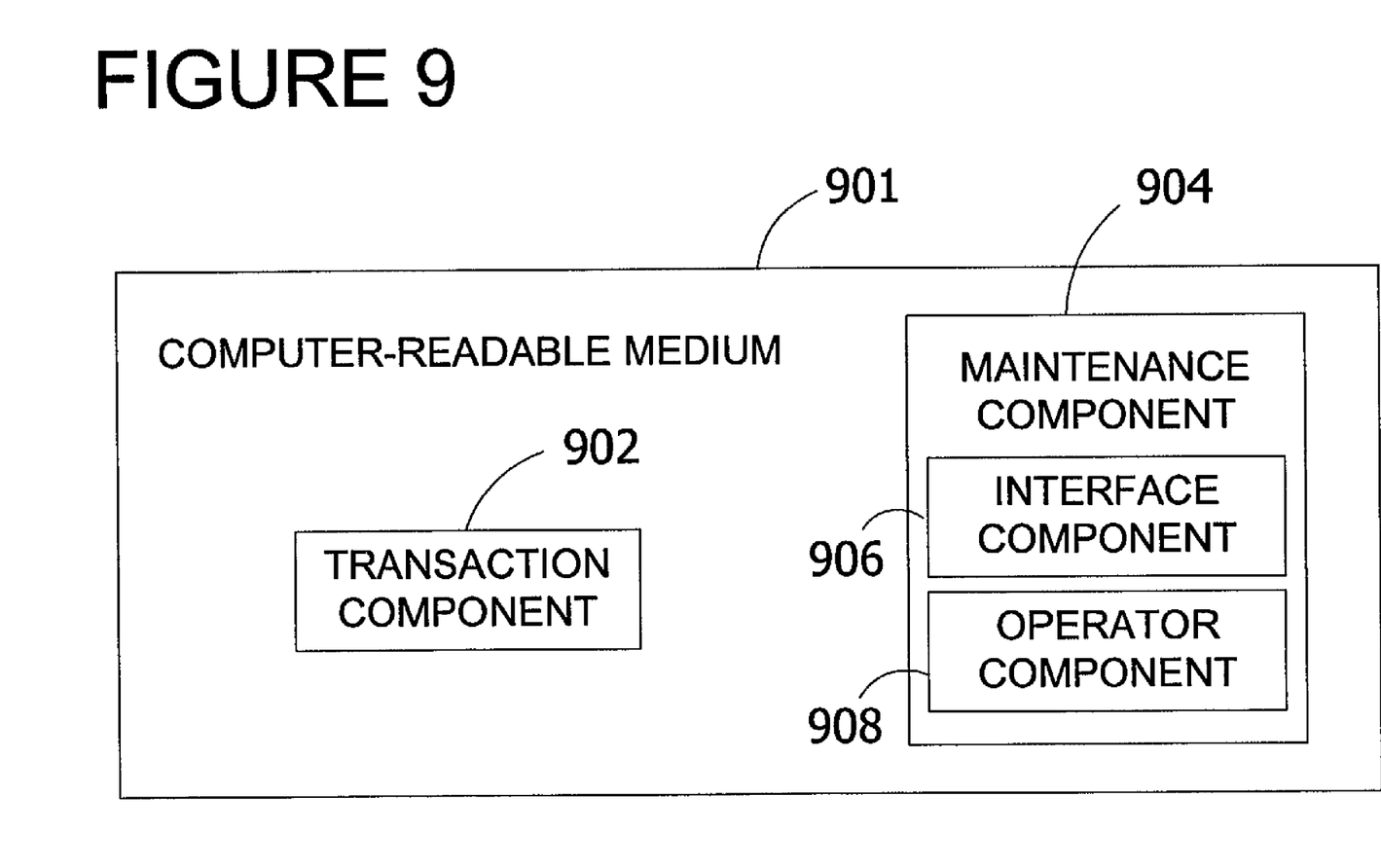
FIG. 9 is a block diagram of one embodiment of the invention illustrating another exemplary computer-readable medium on which the invention may be stored Corresponding reference characters indicate corresponding parts throughout the drawings.

Referring next to FIG. 9, a block diagram illustrates another exemplary computer-readable medium on which the invention may be stored. The computer-readable medium 901 has computer-executable components for delivering one or more advertisements and tracking run-time capacity for each advertisement. The computer-readable medium 901 is associated with at least one server where each server is a node in a tree structure or a member of a parent-child computer hierarchy. The computer-readable medium 901 for a specific node includes a transaction component 902 and a maintenance component 904. The transaction component 902 delivers the advertisements. The maintenance component 904 counts each delivered advertisement and synchronizes the count for each delivered advertisement with a parent and any children of the specific node in the tree structure. The maintenance component 904 comprises an interface component 906 and an operator component 908. The interface component 906 receives a parent value from a parent node of a specific node and receives a child value from at least one child node of the specific node. The received parent value represents contributions to the count from all nodes other than the specific node and other than any children subordinate to the specific node. The received child value represents contributions to the count from the child node and any children subordinate to the child node in the tree. The operator component 908 calculates an updated parent value and an updated child value. The updated parent value includes contributions to the count from the specific node and any nodes subordinate to the specific node in the tree. The updated child value includes contributions to the count from all nodes other than the child node and other than any nodes subordinate to the child node in the tree. The interface component 906 transmits the updated parent value to the parent node of the specific node and transmits the updated child value to the child node of the specific node.

Synchronization Example

The following example illustrates the invention with reference to FIGS. 4, 5, and 6. In the following example, the variable is a counter, Count 1, representing the number of electronically delivered advertisements. In FIG. 5, Child 1 serves an advertisement and increments the variable associated with the advertisement by increasing $T_L$ by one. At the next synchronization interval, Child 1 will go through all of its counters and notify Parent 502 of any updates to its local counters. Child 1 sends a calculated value to Parent 502 equal to $G+T_L-T_P$, where $T_P$ represents the value received from Parent 502 during the last synchronization event. In this example, the calculated value is 0+1−0=1. Parent 502 receives the transmitted, calculated value from Child 1 and recalculates Parent's G by adding Parent's current G (0) to the received update from Child 1 (1) minus the value received from Child 1 during the previous synchronization event (0). The updated G for Parent 502 is then 0+1−0=1. Parent 502 stores the received data value as $T_{C1}$. Parent 502 calculates and transmits $G+T_L-T_{C1}$ back to Child 1, which is 1+0−1=0 where $T_{C1}$ represents the value received from Child 1 during the last synchronization event. The calculated value of 0 is then sent back to Child 1 for Child 1 to update its values by adding Child 1's current G (0) to the received update from Parent 502 (0) minus the value received from Parent 502 during the previous synchronization event (0). The updated G for Child 1 is then 0+0−0=0. Child 1 stores the received data value as $T_P$.

In a further example as illustrated in FIG. 5, Child 2 then serves five of the same advertisements. Child 2 calculates a value for transmission to Parent 502 by $G+T_L-T_P$, which is 0+5−0=5. Parent 502 receives the calculated value of 5 from Child 2 and updates its G by adding Parent's current G (1) to the received update from Child 2 (5). Parent's updated G is now 1+5=6. Parent 502 stores the received data value as $T_{C2}$. Parent 502 calculates and transmits $G+T_L-T_{C2}$ back to Child 2, which is 6+0−5=1 where $T_{C2}$ represents the value received from Child 2 during the last synchronization event. The calculated value of 1 is then sent back to Child 2 for Child 2 to update its values. In this example, the calculated value of 1 sent to Child 2 represents the contribution to the count from Child 1. Child 2 then updates its local values for the variable by adding Child 2's current G (0) to the received update from Parent 502 (1) minus the value received from Parent 502 during the previous synchronization event (0). The updated G for Child 2 is then 0+1−0=1. Child 2 stores the received data value as $T_{C2}$.

Software executing on Child 1, Child 2, or Parent 502 determines the value of the variable by summing $G+T_L$ as stored by Child 1, Child 2, or Parent 502, respectively. In this example, software executing on Child 1 determines a value for the variable by calculating 0+1=1 because Child 1 has not had a synchronization event since Child 2 updated Parent 502.

During the next synchronization event for Child 1 as illustrated in FIG. 6, if Child 1 has not delivered an advertisement since Child 1's last synchronization event, Child 1 transmits $G+T_L-T_P$ to Parent 602, which is 0+1−0=1. Parent 602 updates its local values by adding Parent's current G (6) to the received update from Child 1 (1) minus the value received from Child 1 during the previous synchronization event (1). The updated G for Parent 602 is then 6+1−1=6. In an alternative embodiment, a child sends an empty packet to its parent to receive an update. In this embodiment, Parent 602 does not need to update the local values after receiving the empty packet.

Parent 602 then transmits $G+T_L-T_{C1}$ to Child 1, which is 6+0−1=5. Child 1 updates its local values by adding Child 1's current G (0) to the received update from Parent 602 (5) minus the value received from Parent 602 during the previous synchronization event (0). The updated G for Child 1 is then 0+5−0=5. After this synchronization event, software executing on Child 1 determines the value of the variable by calculating $G+T_L$, which is 5+1=6. At this point, Child 1, Child 2, and Parent 602 have synchronized values with respect to Count 1.

In a further example, a third child (not shown), Child 3, registers with Parent 602 and subscribes to Count 1. Child 3's local data structure is created and initialized to zero. A new field, $T_{C3}$ is added to Parent's local data structure. During the first synchronization event with Parent 602, since Child 3 has not delivered an advertisement, a value of 0 is sent to Parent 602 and Parent 602 returns 6 to Child 3 per the formulae described herein. At this point, Child 1, Child 2, Child 3, and Parent 602 have synchronized values of Count 1.

Those skilled in the art will note that the above examples are simplified examples of the operation of the invention. In other embodiments, possibly hundreds of thousands of variables are asynchronously updated between any given parent and child during any given synchronization event. Further, in one embodiment, a specific counter is adjusted in only one direction. That is, the specific counter can either be incremented or decremented exclusively. For example, the specific counter cannot receive a positive contribution during one update and a negative contribution during a later update.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the preferred embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description and shown in the accompanying drawings shall be interpreted as illustrative and not in a limiting sense.

What is claimed is:

1. A computerized method for synchronizing at least one variable among a plurality of members of a parent-child hierarchy based on data values exchanged between said plurality of members, wherein each member has a calculated value of the variable, said method comprising:
   sending a first data value from a child to a parent of the child, said first data value representing a contribution to the variable from the child and any members subordinate to the child in the hierarchy;
   updating, by the parent, a second data value with the received first data value, said second data value representing a contribution to the variable from all members other than the parent;
   transmitting a third data value from the parent to the child, said third data value representing a contribution to the variable from all members other than the child and other than any members subordinate to the child in the hierarchy; and
   updating, by the child, a fourth data value with the transmitted third data value, said fourth data value representing a contribution to the variable from all members other than the child.

2. The method of claim 1, wherein prior to sending a first data value from a child to a parent of the child, further comprising contributing, by the child, to the first data value by increasing the value of the variable as calculated by the child.

3. The method of claim 1, further comprising calculating, by the parent, a value of the variable by summing the second data value and the contribution to the variable from the parent.

4. The method of claim 1, further comprising calculating, by the child, a value of the variable by summing the fourth data value and the contribution to the variable from the child.

5. The method of claim 1, wherein the specific variable is a counter.

6. The method of claim 1, further comprising maintaining, by the parent, an indicator for each child for each variable that has been updated independent of said child.

7. The method of claim 1, wherein a child sending, the parent updating, the parent transmitting, and the child updating occur during asynchronous synchronization events.

8. The method of claim 1, when the parent and child are connected via the Internet.

9. The method of claim 1, further comprising arranging a plurality of variables in partitions.

10. The method of claim 1, wherein the data values are 64-bit, unsigned integers.

11. The method of claim 1, further comprising initializing the variable for a specific member.

12. The method of claim 1, further comprising:
   registering a specific member with another member to synchronize the variable, said other member being a parent of the specific member;
   subscribing, by the registered, specific member to the variable stored by the parent; and
   transmitting from the parent to the specific member at least one value relating to the subscribed variable to update a value of the variable stored by the specific member.

13. The method of claim 12, further comprising transmitting an error packet from the parent to the specific member if an error has occurred during registration or subscription.

14. The method of claim 12, wherein registering comprises:
   transmitting a member identifier from the specific member to the parent; and
   transmitting a unique token corresponding to the transmitted, member identifier from the parent to the specific member.

15. The method of claim 12, wherein subscribing comprises:
   transmitting a variable identifier from the specific member to the parent; and
   transmitting a unique token corresponding to the transmitted, variable identifier from the parent to the specific member.

16. The method of claim 12, wherein registering and subscribing operate from the specific member through one or more successive parents to a master parent at a root of the hierarchy.

17. The method of claim 1, wherein at least one member includes a plurality of processors, and further comprising optimizing access to memory by said plurality of processors.

18. The method of claim 17, wherein optimizing comprises providing a memory component for each processor.

19. The method of claim 18, wherein optimizing further comprises providing a cache line for each processor to access the provided memory component.

20. The method of claim 18, wherein optimizing further comprises each processor performing operations via the provided memory component to bypass access to a register.

21. The method of claim 18, wherein optimizing further comprises the at least one member calculating a value of the variable by accessing each memory component of the at least one member.

22. One or more computer readable media having computer-executable instructions for performing the method recited in claim 1.

23. A system for synchronizing at least one variable among members of a child parent hierarchy based on data values exchanged between said members, wherein each member has a calculated value of the variable, said system comprising:
   means for a child to send a first data value to a parent of the child, wherein the first data value represents a contribution to the variable from the child and any members subordinate to the child in the hierarchy;
   means for the parent to update a second data value with the received first data value, wherein the second data value represents a contribution to the variable from all members other than the parent;
   means for the parent to transmit a third data value to the child, wherein the third data value represents a contribution to the variable from all members other than the child and other than any members subordinate to the child in the hierarchy; and
   means for the child to update a fourth data value with the transmitted third data value; wherein the fourth data value represents a contribution to the variable from all members other than the child.

24. The system of claim 23, further comprising means for the parent to maintain an indicator for each child for each variable that has been updated independently of said child.

25. The system of claim 23, further comprising means for initializing the variable for a specific member.

26. The system of claim 23, wherein each member includes a plurality of processors, and further comprising means for optimizing access to memory by said plurality of processors.

* * * * *

UNITED STATES PATENT AND TRADEMARK OFFICE
CERTIFICATE OF CORRECTION

| | |
|---|---|
| PATENT NO. | : 6,968,372 B1 |
| APPLICATION NO. | : 09/981026 |
| DATED | : November 22, 2005 |
| INVENTOR(S) | : Donald Thompson et al. |

It is certified that error appears in the above-identified patent and that said Letters Patent is hereby corrected as shown below:

In column 3, line 46, after "stored" insert -- . --.

In column 5, line 25, after "media" insert -- . --.

Signed and Sealed this

Twenty-third Day of March, 2010

David J. Kappos
*Director of the United States Patent and Trademark Office*